INVENTOR.
YORIHIRO MURATA
BY
ATTORNEY

United States Patent Office 3,591,527
Patented July 6, 1971

3,591,527
CERAMIC COMPOSITIONS AND METHODS
OF MAKING
Yorihiro Murata, North Tonawanda, N.Y., assignor to
The Carborundum Company, Niagara Falls, N.Y.
Filed Sept. 10, 1969, Ser. No. 856,794
Int. Cl. B01k *3/06;* C01b *35/66;* H01b *1/06*
U.S. Cl. 252—518          16 Claims

ABSTRACT OF THE DISCLOSURE

Refractory, hard, wear-resistant and corrosion-resistant compositions especially suitable for fabricating current-conducting elments useful in aluminum refining, are produced by hot pressing a mixture consisting essentially of about 80–99 percent niobium diboride and about 1–20 percent titanium mononitride at about 2000–2200° C.

BACKGROUND OF THE INVENTION

The present invention relates to novel ceramic compositions produced by hot pressing mixtures of niobium diboride ($NbB_2$) and titanium mononitride (TiN), to raw batches and methods useful for producing such compositions, and to articles fabricated from such compositions, particularly current-conducting elements for use in the refining of aluminum.

The refractory borides have present or potential value in certain applications as hard, refractory, corrosion-resistant and wear-resistant materials. Their properties suggest their use in bearings; seals, parts for handling abrasive powders; wire-drawing dies; cutting tool tips; rocket nozzles; turbine buckets; containers for molten metals; impellers, bearings and bushings for molten metal pumps; dies for hot pressing; and so on.

The borides of zirconium, titanium tantalum and niobium, and mixtures thereof, have been employed in current-conducting elements used in connection with the production and purification of metals such as aluminum. See, for example, Ransley U.S. Pat. 3,202,600; Morgan U.S. Pat. 3,081,254; Canadian Pat. 601,257; and British Pat. 802,905. Such current-conducting elements are employed in electrolytic cells for the production of aluminum, including reduction cells for the production of crude aluminum and three-layer cells for the purification of aluminum. The current-conducting elements may, for example, constitute electrodes, usually the cathodes, of reduction cells, or current leads through which electrolyzing current flows to a body of molten aluminum either in a reduction cell or in a purification cell. Such current-conducting elements may be produced by hot pressing the boride powder into a body of the desired shape under suitable conditions of temperature, pressure and time. For example, a continuous hot pressing process may be employed to form a rod of the desired dimensions. It appears that niobium diboride may be somewhat superior to the borides of zirconium, titanium and tantalum in this application, it being somewhat more resistant to corrosion by molten aluminum and current-conducting elements formed therefrom thus having a somewhat longer useful life.

Niobium diboride bodies produced by hot pressing in accordance with the prior art possess certain disadvantages which adversely affect their usefulness and, in particular, their resistance to corrosion by molten aluminum. Examination of the microstructure of such bodies reveals the presence of many cracks and pores, which render the body susceptible to penetration of the molten aluminum, facilitating corrosion. It also reveals a comparatively large crystal size, or grain size, which may account in part for the presence of the undesirable cracks and pores. Such bodies are also characterized by a comparatively low density, due to their porosity.

SUMMARY OF THE INVENTION

In accordance with the present invention, a novel hard, refractory wear-resistant and corrosion-resistant composition of matter is produced by preparing an intimate mixture, or raw batch, consisting essentially of from about 80 percent to about 99 percent $NbB_2$ and, conversely, from about 1 percent to about 20 percent TiN, and hot pressing the mixture at a temperature in the range from about 2000° C. to about 2200° C. As a result of the hot pressing, the chemical and physical properties and composition of the mixture are substantially changed and a novel composition is produced which has a wide range of utilities and which is particularly suited as a composition for current-conducting elements for use in the refining of aluminum. The composition is characterized by certain highly desirable properties, especially high density, small grain size, low porosity, few or no cracks, and high hardness, and is vastly superior in regard to these properties when compared to hot pressed $NbB_2$. It has been found that the addition of from about 1 percent to about 20 percent TiN to the $NbB_2$ in accordance with the invention has the unexpected desirable effect of inhibiting crystal growth during hot pressing, resulting in a hot pressed composition having a smaller grain size, with fewer cracks and pores and therefore a higher density and hardness, as compared to hot pressed $NbB_2$ alone. Preferably, the raw batch consists esssentially of from about 90 percent to about 97.5 percent $NbB_2$ and from about 2.5 percent to about 10 percent TiN, these proportions resulting in a particularly desirable decrease in grain size, porosity, and incidence of cracks, and increase in density and hardness. Minimum grain size, porosity, and incidence of cracks, and maximum density and hardness are obtained with the most preferred raw batch containing about 95 percent $NbB_2$ and about 5 percent TiN.

BRIEF DESCRIPTION OF THE DRAWINGS

The invention will be described in part with reference to the accompanying drawings wherein.

DESCRIPTION OF THE PREFERRED EMBODIMENTS

Example 1

Figure 1:
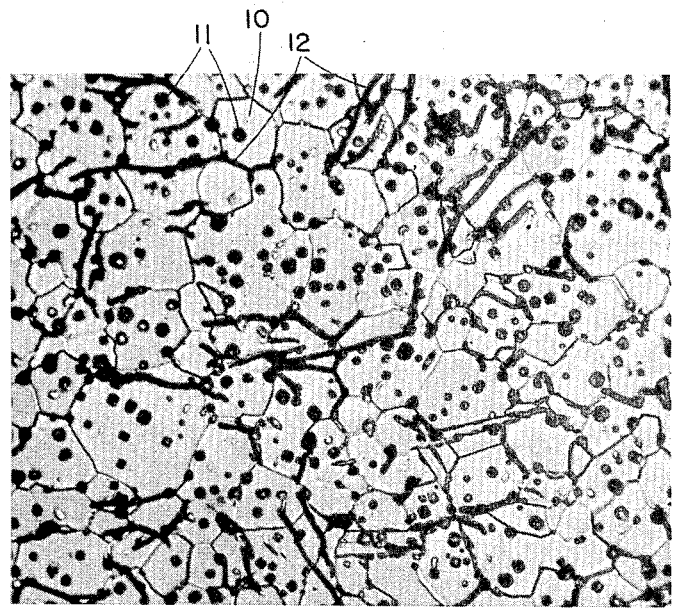
FIG. 1 is a photomicrograph taken at about 500 magnifications and then enlarged 1.8 times showing the microstructure of hot pressed $NbB_2$ with no TiN, prepared in accordance with Example 2.

Preparation of composition from 95% $NbB_2$ and 5% TiN.—To a raw batch composed of 133 g. of $NbB_2$ having an average particle size of about 1 micron and 7 g. of TiN having an average particle size of about 3.5 microns, sufficient ethyl alcohol is added to form a thick slurry. The slurry is poured into a rubber lined ball mill having a length of approximately 7.5 cm. and an inside diameter of approximately 10 cm., the mill previously having been filled to about quarter of its capacity with stainless steel balls ranging from approximately 1 cm. to approximately 1.5 cm. in diameter. Milling is carried on for about 30 minutes, after which the mixture is dried in a warm air oven at about 85° C. for about 4 hours. After removal of the stainless steel balls by means of a coarse sieve, the mixture is ready for hot pressing.

A cylindrical graphite mold approximately 15 cm. high having an outer diameter of approximately 7.5 cm. and a cylindrical compression chamber approximately 2.5 cm. in diameter with fitting graphite plungers is employed for the hot pressing. A 22.7 g. portion of the ball-milled mixture is placed in the mold, this amount being calculated as the quantity necessary to form a hot pressed body of theoretical density approximately 2.5 cm. in diameter and approximately 0.6 cm. in thickness The mold is placed on a vibrating table to settle and level its contents. The mold is then placed in a container which is disposed within the coil of a high-frequency induction furnace, and the container is covered with a lid through which a mold plunger extends. A pressure of about 185 kg./sq. cm. is applied and maintained on the mold plungers. A stream of nitrogen is introduced continuously into the container through a port therein, venting being provided for by a second port in the container. The power to the coil is turned on and the temperature of the mold and contents is allowed to reach 2100° C., as determined by an optical pyrometer. This requires about 45 minutes. This temperature is held substantially constant for 30 minutes, whereupon the power is shut off and the pressure is released. The nitrogen stream is continued and the system is permitted to cool to about room temperature, about 5 hours being required. The hot pressed body is ejected from the mold and polished by means of a diamond grinding disc.

The body formed by the foregoing steps is a round slug measuring approximately 2.5 cm. in diameter by approximately 0.6 cm. in thickness.

Example 2

Preparation of compositions from 80–100% $NbB_2$ and 0–20% TiN.—Hot pressed slugs of the same dimensions as the one prepared in Example 1 are prepared in accordance with the method and conditions of Example 1, using the amounts of $NbB_2$ and TiN shown in Table I to prepare the raw batches, and using the amount of raw batch shown in Table I for each slug.

TABLE I

| Percent | | G. admixed | | G. of raw batch per slug |
|---|---|---|---|---|
| $NbB_2$ | TiN | $NbB_2$ | TiN | |
| 100 | 0 | 140 | 0 | 23.2 |
| 99 | 1 | 138.6 | 1.4 | 23.2 |
| 97.5 | 2.5 | 136.5 | 3.5 | 23.0 |
| 92.5 | 7.5 | 130.5 | 10.5 | 22.7 |
| 90 | 10 | 126 | 4.0 | 22.5 |
| 80 | 20 | 112 | 28.0 | 21.8 |

Considering the hot pressing operation in greater detail, the intimate mixture of $NbB_2$ and TiN may either be hot pressed in a mold which is of suitable design to produce a current-conducting element or other desired article directly, or alternatively, the mixture may be hot pressed in a mold which is designed to form a slug from which the desired article can be fabricated by conventional means. In general, it is economically preferable to form the desired article in the first instance, thereby eliminating the intermediate step whereby the inventive composition is first formed as a slug from which the article may be fabricated. On the other hand, however, it may at times be preferred or necessary to form the composition as a slug first, as for example, when a mold of the shape desired for the final article is unavailable or where an article of a particularly intricate shape is required. A continuous hot pressing operation may be employed if desired, e.g., to produce a rod several inches in diameter and several feet long which is useful as an electrode for aluminum refining.

In order to impart optimum properties to the hot pressed composition, it is important that the $NbB_2$ and TiN used to prepare the initial mixture be finely divided, preferably having a maximum particle size of about 5 microns.

In order to produce a hot pressed composition of suitable quality, it is important that the finely divided powders be intimately mixed. For the purposes of the invention, the intimate mixture may be obtained by any convenient means. However, the following procedure has been found to be desirable. The ingredients are placed in a ball mill with a sufficient volume of a suitable liquid to form a thick slurry, and the mill is rotated to obtain the desired mixing, following which the mixture is dried. In view of the abrasive nature of the ingredients, it is preferred to use a rubber lined ball mill, and the balls should be of some hard material such as stainless steel, or tungsten carbide bonded by cobalt. The liquid selected for the purpose should be such as will not affect the rubber lining of the ball mill, and it should preferably be relatively volatile. Among the liquids found suitable are ethanol and methanol. Rotation of the ball mill for about 30 minutes or less usually suffices to give the desired intimate intermingling of the ingredients, and unnecessarily long periods of rotation should be avoided to minimize contamination resulting from the abrasive action of the ingredients on the balls. The drying step may be carried out in any convenient manner but preferably is conducted at a temperature of less than about 100° C., since higher temperatures may tend to result in undesirable agglomeration of the mixture. A warm air oven or a vacuum drier may conveniently be used.

The hot pressing step may be carried out in any of a variety of conventional type molds known in the art, such as graphite molds. After placing the $NbB_2$-TiN mixture in the mold it is desirable, though not essential, to apply vibration to the mold in order to facilitate the settling of the particles to achieve more uniform packing and to level the surface of the powder to give a layer of fairly uniform thickness.

Essentially, the hot pressing step consists of subjecting the intimately mixed ingredients to pressure at an elevated temperature. Although the precise means of achieving these conditions is not critical, it is generally convenient to proceed as follows. The mold, containing the mixture, is placed in a closed container which is disposed within the coil of a high-frequency induction furnace, and while the mixture in the mold is heated to about 2000–2200° C. it is subjected to pressure by means of a plunger, passing through the lid of the container, that transmits pressure from a suitable device such as a pressure cylinder. In order to protect the mold from oxidation, especially if a graphite mold is employed, and also in order to prevent oxidation of the components of the raw batch in the mold, it is desirable to carry out the hot pressing in a non-oxidizing atmosphere. A continuous stream of nitrogen or other inert gas such as argon or helium may be introduced into the container before starting the heating, to replace the air and maintain an inert atmosphere, or the container may be evacuated.

The temperature should be sufficiently high during hot pressing to permit densification, under the influence of pressure, to a relative density (i.e., actual density/theoretical density expressed as percent) of the order of 95 percent or more. On the other hand, an unnecessarily high temperature should be avoided, since excessive temperatures tend to result in the decomposition of the TiN, forming free nitrogen, which may generate voids within the piece. In general, hot pressing temperatures in the range from about 2000° C. to about 2200° C. may be used, and about 2100° C., as employed in the examples, is optimum.

As is well-known, the pressure employed in hot pressing operations is also an important factor. Although maximum pressures are not critical the minimum pressure used must, of course, be such as to obtain the required degree of densification at the prevailing temperature during the heating time employed. For the present compositions a pressure of at least about 100 kg./sq. cm. is desirable, and a pressure within the range from about 150 to 200 kg./sq. cm. is preferred. Much higher pressures may be used but there appears to be no advantage in general to the use of pressures above about 350 kg./sq. cm.

The time during which the composition is maintained under maximum temperature and the desired pressure conditions should be sufficiently long to permit virtually maximum densification. For the raw batches contemplated by this invention, the point of virtually maximum densification is usually reached within about 30 minutes after maximum temperature is reached. Longer periods may be employed, but unnecessarily long periods should be avoided since other properties of the hot pressed composition, such as grain size, may be adversely affected.

It is generally known that there is some degree of interrelationship between the temperature, pressure and time of hot pressing. Thus as lower pressures are employed, somewhat longer periods of time may be required in order to achieve the desired degree of densification. However, as noted above, unduly prolonged time periods at the temperature used for hot pressing may tend to result in larger grain size, and it will therefore generally be preferred to employ a sufficiently high pressure to achieve densification in a relatively short time. Also, the higher the temperature employed within the range specified, the less pressure and/or time required for virtually maximum densification.

After virtually maximum densification has been achieved, the composition is permitted to cool. From Example 1, it may be seen that the pressure may be released at the outset of the cooling stage. It may, however, optionally be maintained until any convenient point in the cooling stage. While the cooling stage required about 5 hours in Example 1, it should be noted that the rate of temperature decrease will ordinarily become slower as the temperature becomes lower, and that the rapid rate of cooling at the beginning of the cooling stage is highly desirable. More particularly, it is preferred that the temperature drop to the range of about 800–1000° C. within the first hour or less. Rapid cooling to this point minimizes the possibility of undesirable changes in the hot pressed composition, particularly since rapid cooling tends to favor retention of a small grain size. Once the temperature has been reduced to about 800–1000° C., however, no significant further change of grain size occurs, and accordingly further cooling may proceed leisurely. When the temperature approaches room temperature, the body may be ejected from the mold. It is generally desirable to grind the surfaces of the hot pressed body by means of a diamond grinding disc or other conventional means, in order to polish the surfaces and remove any particles which may adhere to the piece from the graphite mold.

As noted above, the ingredients originally present in the raw batch undergo substantial chemical changes, and physical changes, including densification and solid solution formation, during hot pressing. While the general nature of certain of these changes can be ascertained to some extent, it is virtually impossible with presently available means to characterize completely the composition of the hot pressed body. For example, phase analysis by X-ray powder diffractometry using monochromatic copper K-alpha radiation indicated that a hot pressed body prepared in accordance with Example 1 was composed of at least three phases. A major amount of a $NbB_2$ type phase and minor amounts of $Nb_3B_4$ and a TiN type phase were found to be present. In addition, a small amount of one or more unidentifiable phases was probably present. While such a phase composition appears to be unique, it is to be observed that the precise composition of the $NbB_2$ type and TiN type phases cannot by any presently available means be ascertained, nor can the precise amounts of the three identified phases be established. Thus even apart from the unidentifiable phases which may be present, a meaningful definition of the hot pressed composition is impossible. Furthermore, the phase composition of the hot pressed bodies varies markedly with the proportion of $NbB_2$ to TiN in the raw batch, as well as with the temperature of hot pressing.

In general, however, it may be said that articles made according to this invention are refractory, hard, corrosion-resistant and wear-resistant, and are characterized by high density, low porosity, small grain size, and a low incidence of cracks. As a result of these highly desirable properties, it will be apparent that compositions according to the invention will find utility not only in current-conducting elements, but also in various other applications where such properties are required, such as thermocouple protection tubes, disc brakes, and some of the applications for the refractory borides mentioned herein at the outset.

The relative density and the superficial hardness on the Rockwell N15 scale of hot pressed $NbB_2$ and of the compositions of the invention, prepared as in Examples 1 and 2, are set forth in Table II.

TABLE II

| Composition of raw batch (percent) | | Properties of hot pressed body | |
|---|---|---|---|
| $NbB_2$ | TiN | Rockwell N15 hardness | Relative density (percent) |
| 100 | 0 | 93.1 | 95.76 |
| 99 | 1 | 94.1 | 96.05 |
| 97.5 | 2.5 | 94.3 | 96.71 |
| 95 | 5 | 95.4 | 99.86 |
| 92.5 | 7.5 | 94.2 | 98.56 |
| 90 | 10 | 94.6 | 98.75 |
| 80 | 20 | 94.5 | 97.11 |

The relative densities were calculated from actual densities measured in accordance with the method of A.S.T.M. Designation C20–46 and from theoretical densities determined from the pore distribution in the hot pressed bodies by microscopy using the linear intercept method. It may be seen from Table II that the inventive compositions made from raw batches containing about 1–20 percent TiN and about 80–99 percent $NbB_2$ are all superior to hot pressed $NbB_2$ in respect of hardness and density. Maximum hardness and relative density are achieved with the most preferred mixture of about 5 percent TiN and about 95 percent $NbB_2$.

FIG. 1 shows the microstructure of hot pressed $NbB_2$ prepared in accordance with Example 2. The size of the crystals, or grains, such as 10, is quite large, and the mean grain size as determined by the linear intercept method is about 16 microns. Many pores, such as 11, are evident, both within the crystals and in the grain boundaries. Many cracks, such as 12, are also evident, both through the crystals and along the grain boundaries.

Figure 2:
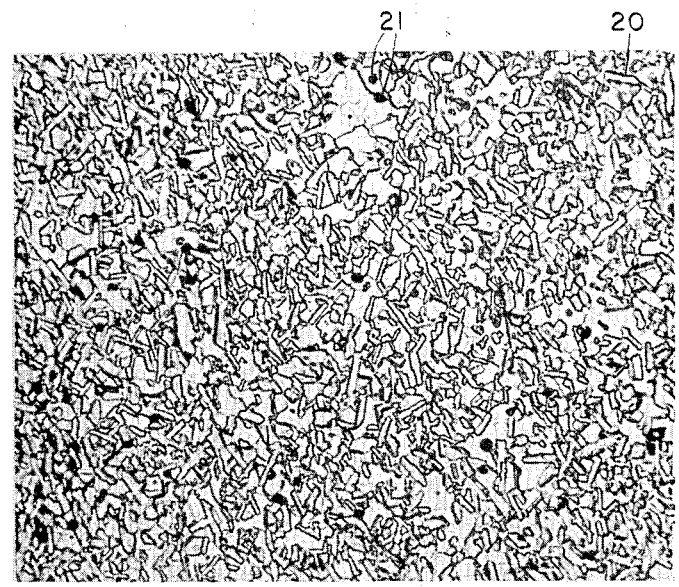
FIG. 2 is a photomicrograph at the same magnification and enlargement as FIG. 1 showing the superior microstructure of a hot pressed mixture of 95 percent $NbB_2$ and 5 percent TiN according to the invention, prepared in accordance with Example 1.

FIG. 2 shows the microstructure of a hot pressed body according to the invention made by hot pressing the most preferred raw batch containing 95 percent $NbB_2$ and 5 percent TiN in accordance with Example 1. The size of the grains, such as 20, is very small, the mean grain size being only about 2 microns. The small grain size is accompanied by very few pores, such as 21, and virtually no cracks.

Figure 3:
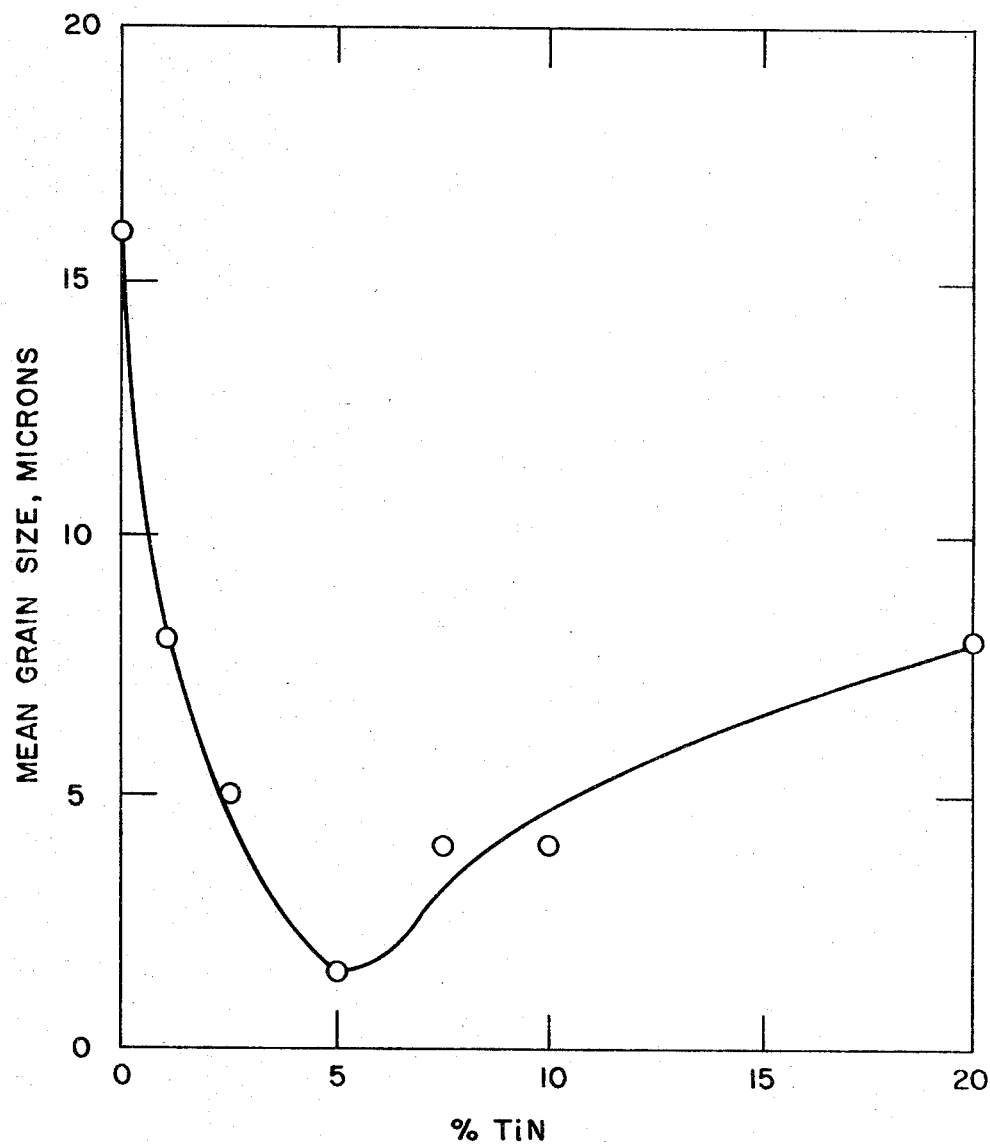
FIG. 3 is a graph showing the mean grain size of the compositions of the invention plotted as a function of the percent of TiN in the raw batch.

FIG. 3 shows the mean grain size, in microns, of hot pressed compositions prepared according to Examples 1 and 2, plotted as a function of the percentage of TiN in the raw batch. Means grain sizes were determined by microscopy using the linear intercept method. As may be seen, the means grain size is about 16 microns in the absence of any TiN. With about 1–20 percent TiN, the mean grain size is only about one-half that value, or about 8 microns, or less. The decreased grain size is accompanied by a decrease in porosity and the incidence of cracks, as is evidenced by the higher relative densities of these compositions as reported in Table II. With the preferred raw batches containing about 90–97.5 percent NbB$_2$ and about 2.5–10 percent TiN, the mean grain size is only about 5 microns or less, and the incidence of pores and cracks is proportionately lower. With the most preferred raw batch containing about 95 percent NbB$_2$ and about 5 percent TiN, the mean grain size is at a minimum, about 2 microns, and the incidence of pores and cracks is likewise at a minimum.

A comparative test was run as follows to assess the resistance to molten aluminum of the compositions of the invention and of hot pressed NbB$_2$. Slugs were prepared from 95% NbB$_2$–5% TiN as in Example 1 and from NbB$_2$ without any TiN as in Example 2. From these slugs, specimens were cut measuring approximately 1.25 cm. wide, 0.6 cm. thick, and 2.2 cm. long, and the specimens were polished with diamond dust. The specimens were immersed vertically, to the extent of about half their length, in molten aluminum at 700–725° C. for 72 hours, then removed and examined visually. The NbB$_2$ specimen was observed to have numerous cracks, as long as about 0.5 cm., presumably due to growth of the cracks present in the microstructure of the hot pressed body upon exposure to hot molten aluminum. The specimen prepared from 95% NbB$_2$–5% TiN, in marked contrast, was completely intact and exhibited no sign of cracks.

Except as otherwise expressly stated, all references to amounts or proportions of materials in terms of percentages in the foregoing specification and the following claims refer to percentages by weight.

While the invention has been described and illustrated herein with reference to certain examples and preferred embodiments, it is to be understood that various changes and modifications may be made by those skilled in the art without departing from the inventive concept.

I claim:

1. A composition of matter made by hot pressing an intimate mixture consisting essentially of from about 80 to about 99 percent niobium diboride and from about 1 to about 20 percent titanium mononitride at a temperature in the range from about 2000° C. to about 2200° C.

2. A composition of matter according to claim 1 wherein the mixture consists essentially of from about 90 percent to about 97.5 percent niobium diboride and from about 2.5 to about 10 percent titanium mononitride.

3. A composition of matter according to claim 1 wherein the mixture consists essentially of about 95 percent niobium diboride and about 5 percent titanium mononitride.

4. A composition of matter according to claim 1 wherein the hot pressing is carried out at a pressure of at least about 100 kg./sq. cm.

5. A current-conducting element formed from a hot pressed composition as defined in claim 1.

6. A current-conducting element formed from a hot pressed composition as defined in claim 2.

7. A current-conducting element formed from a hot pressed composition as defined in claim 3.

8. A current-conducting element formed from a hot pressed composition as defined in claim 4.

9. A process for making a composition of matter suitable for making refractory, hard, wear-resistant, corrosion-resistant articles, comprising hot pressing an intimate mixture consisting essentially of from about 80 to about 99 percent niobium diboride and from about 1 to about 20 percent titanium mononitride at a temperature in the range from about 2000° C. to about 2200° C.

10. A process according to claim 9 wherein said mixture consists essentially of from about 90 to about 97.5 percent niobium diboride and from about 2.5 to about 10 percent titanium mononitride.

11. A process according to claim 9 wherein said mixture consists essentially of about 95 percent niobium diboride and about 5 percent titanium mononitride.

12. A process according to claim 9 wherein said hot pressing is carried out at a pressure of at least about 100 kg./sq. cm.

13. A process according to claim 12 wherein said hot pressing is carried out at a temperature of about 2100° C.

14. A raw batch suitable for the manufacture of refractory, hard, wear-resistant, corrosion-resistant compositions, said raw batch consisting essentially of from about 80 to about 99 percent niobium diboride and from about 1 to about 20 percent titanium mononitride.

15. A raw batch according to claim 14 in which the niobium diboride is present to the extent of from about 90 to about 97.5 percent and the titanium mononitride is present to the extent of from about 2.5 to about 10 percent.

16. A raw batch according to claim 14 in which the niobium diboride is present to the extent of about 95 percent and the titanium mononitride is present to the extent of about 5 percent.

References Cited

UNITED STATES PATENTS

| | | | |
|---|---|---|---|
| 3,028,324 | 4/1962 | Ransley | 204—67 |
| 3,202,600 | 8/1965 | Ransley | 204—279 |

FOREIGN PATENTS

| | | | |
|---|---|---|---|
| 1,127,093 | 1962 | Germany | 106—55 |

DOUGLAS J. DRUMMOND, Primary Examiner

U.S. Cl. X.R.

106—55; 204—292